United States Patent [19]

Weaver et al.

[11] 4,107,596
[45] Aug. 15, 1978

[54] EFFICIENT BIDIRECTIONAL POWER CONVERTER FOR PORTABLE DATA GATHERING APPARATUS

[75] Inventors: Daniel J. Weaver, San Jose, Calif.; Robert Treiber, Centerport; Avner Wolanow, Melville, both of N.Y.

[73] Assignee: The Singer Company, Binghamton, N.Y.

[21] Appl. No.: 734,693

[22] Filed: Oct. 21, 1976

[51] Int. Cl.² .......................... G05F 1/56; G05F 1/58
[52] U.S. Cl. .................................. 323/17; 323/22 T; 323/25; 323/DIG. 1; 363/124
[58] Field of Search ............ 321/2; 323/17, 20, 22 T, 323/24, DIG. 1, 23, 25; 363/124, 131, 74, 18; 361/90, 91, 18

[56] References Cited

U.S. PATENT DOCUMENTS

| | | | |
|---|---|---|---|
| 3,353,032 | 11/1967 | Morgan et al. | 323/DIG. 1 |
| 3,523,239 | 8/1970 | Heard | 323/20 |
| 3,571,697 | 3/1971 | Phillips | 323/17 |
| 3,621,372 | 11/1971 | Paine | 321/2 |
| 3,781,653 | 12/1973 | Marini | 323/DIG. 1 |
| 3,931,567 | 1/1976 | Kostecki | 323/17 |
| 4,002,965 | 1/1977 | Hollander | 323/17 |

OTHER PUBLICATIONS

Telettra No. 27, pp. 67-72, Nov. 1975, "Multiplex Equip. Power Supply" by C. Eccher.

*Primary Examiner*—Gerald Goldberg
*Attorney, Agent, or Firm*—Paul Hentzel; James C. Kesterson

[57] ABSTRACT

Input and output switching transistors are alternatively activated to form a charging path and a discharging path for an inductor. The inductor periodically charges through the input transistor from an unregulated rechargeable battery, and discharges through the output transistor into an output capacitor. The output voltage taken across the output capacitor is regulated by negative feedback which varies the inductor charging period through the input transistor. The converter regulation is bidirectional. The voltage from the battery is initially greater than the regulated output voltage, but decreases to a value less than the output voltage as the battery discharges. When the battery is fully charged the converter regulates the battery voltage down to the output voltage. As the battery voltage drops through discharge, the converter regulates the lower battery voltage up to the output voltage. When the output voltage is not required by the data gathering apparatus, the output transistor is deactivated terminating the output voltage and establishing a residual standby mode in the power converter.

14 Claims, 6 Drawing Figures

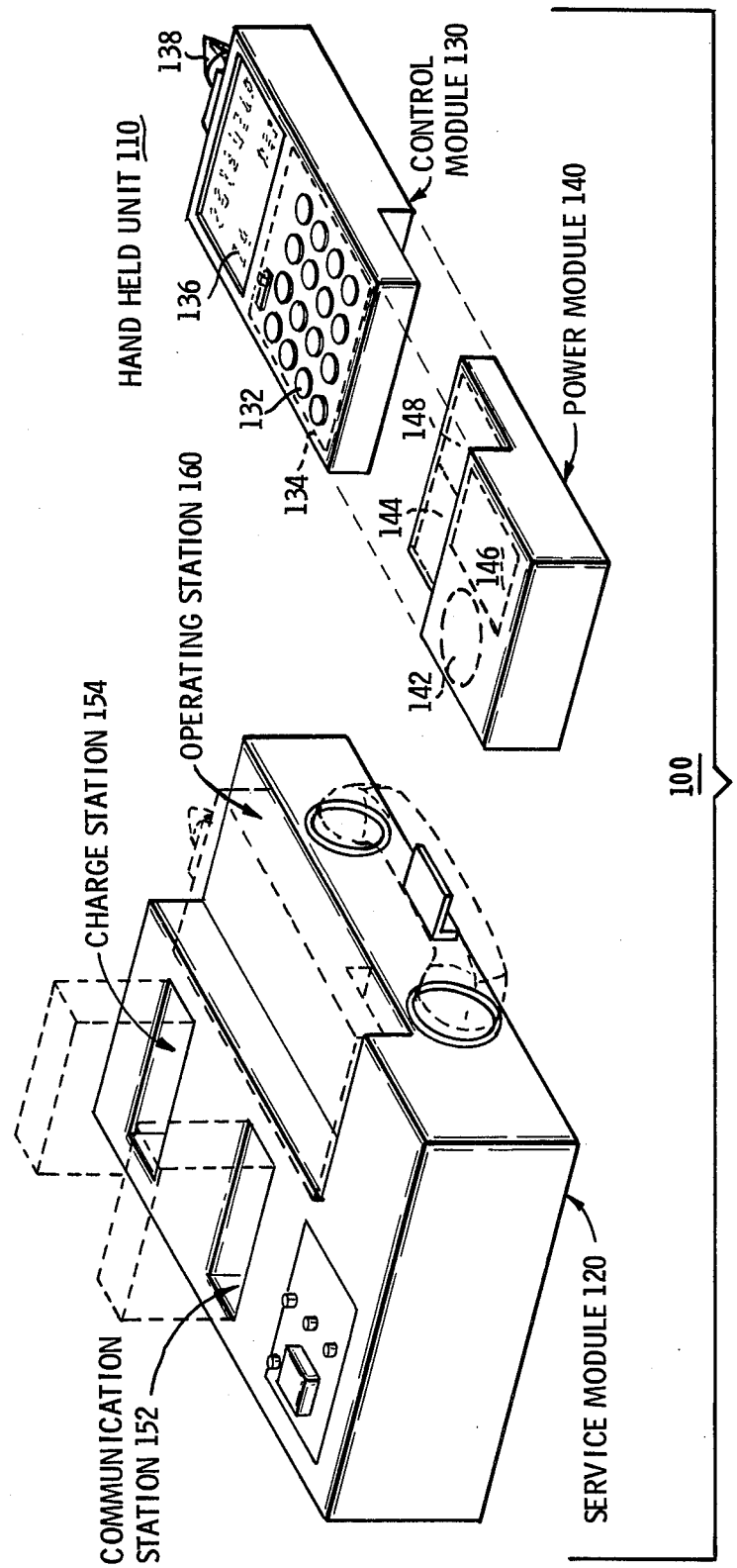
Fig_1

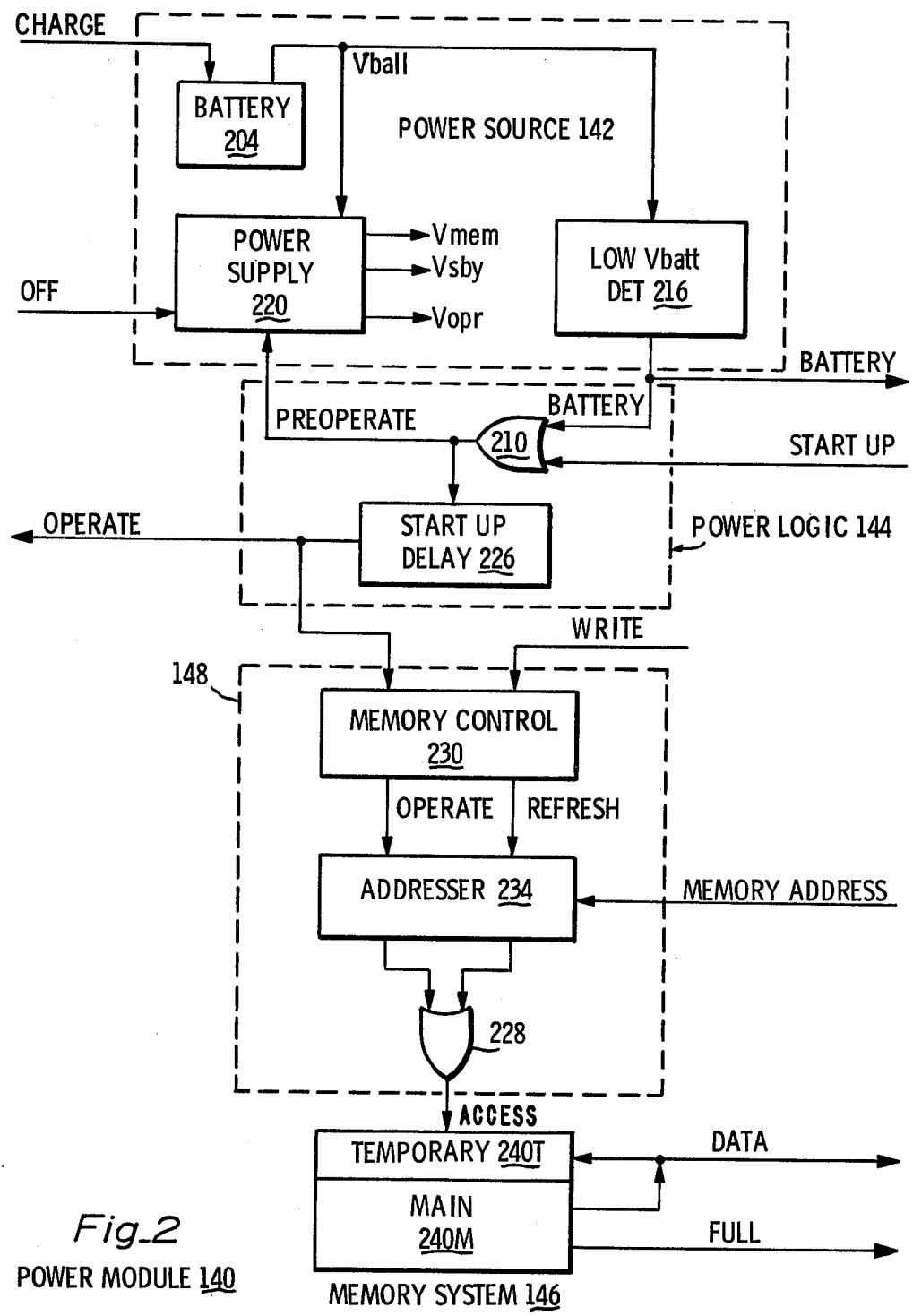
Fig_2
POWER MODULE 140

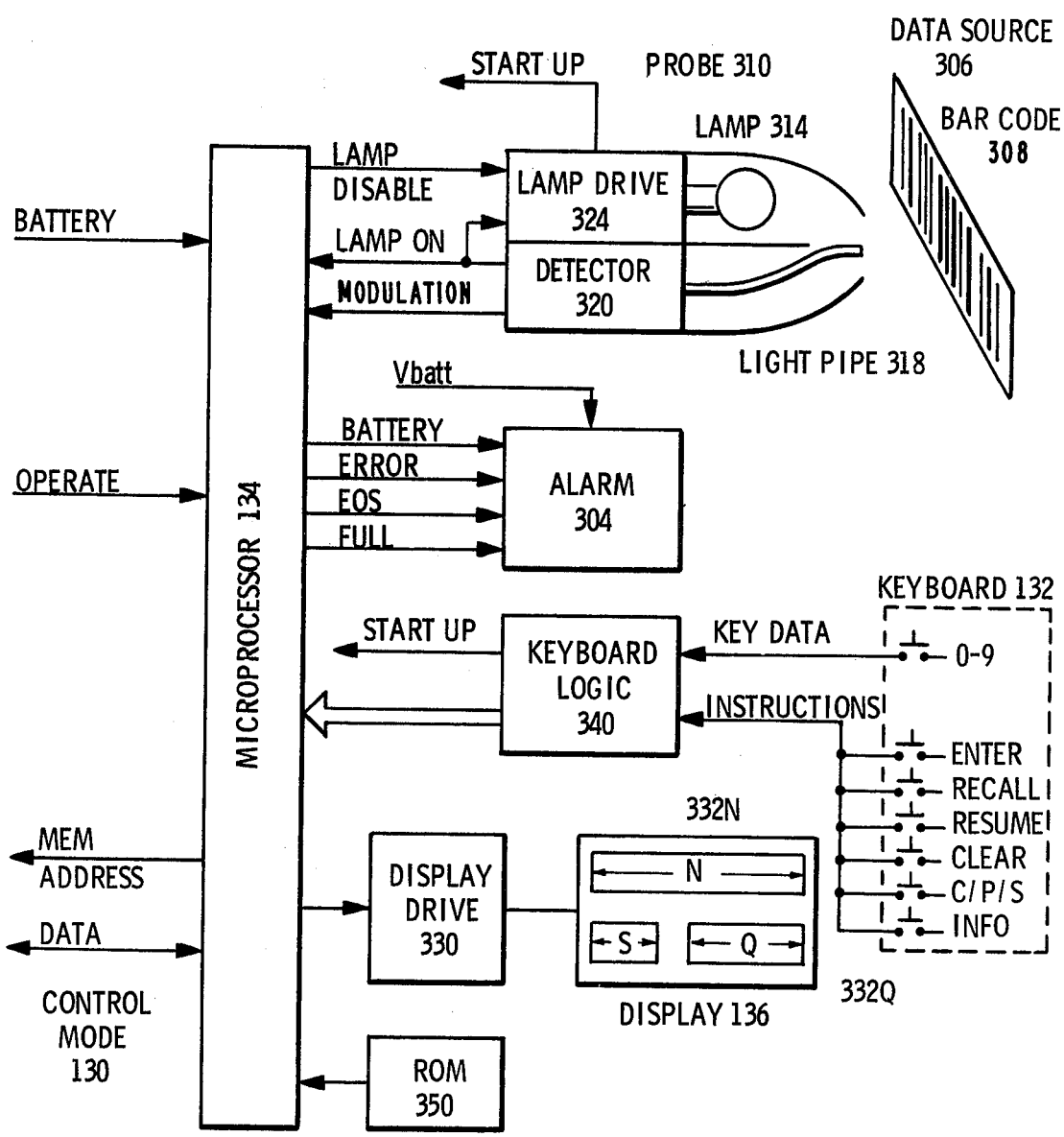
Fig_3

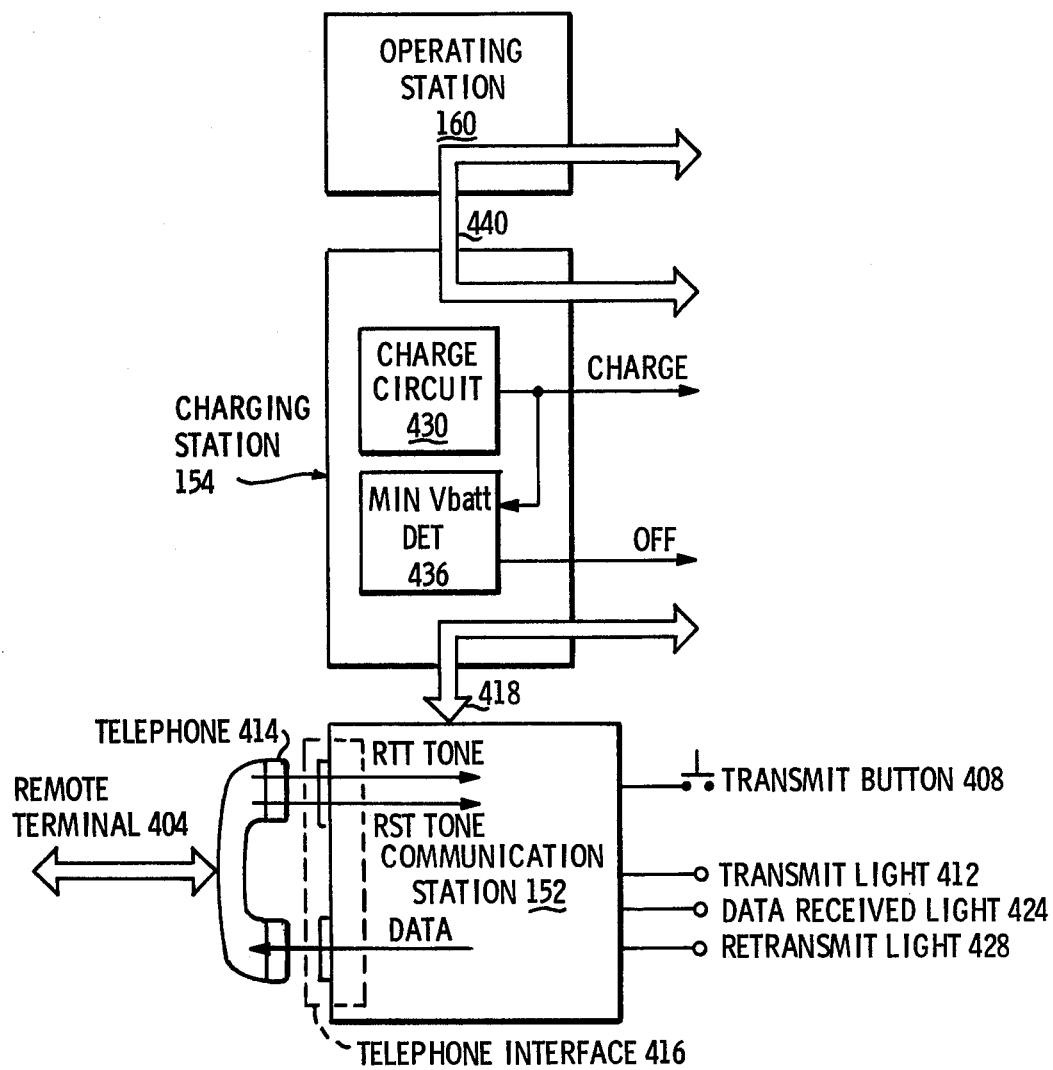
Fig_4
SERVICE MODULE 120

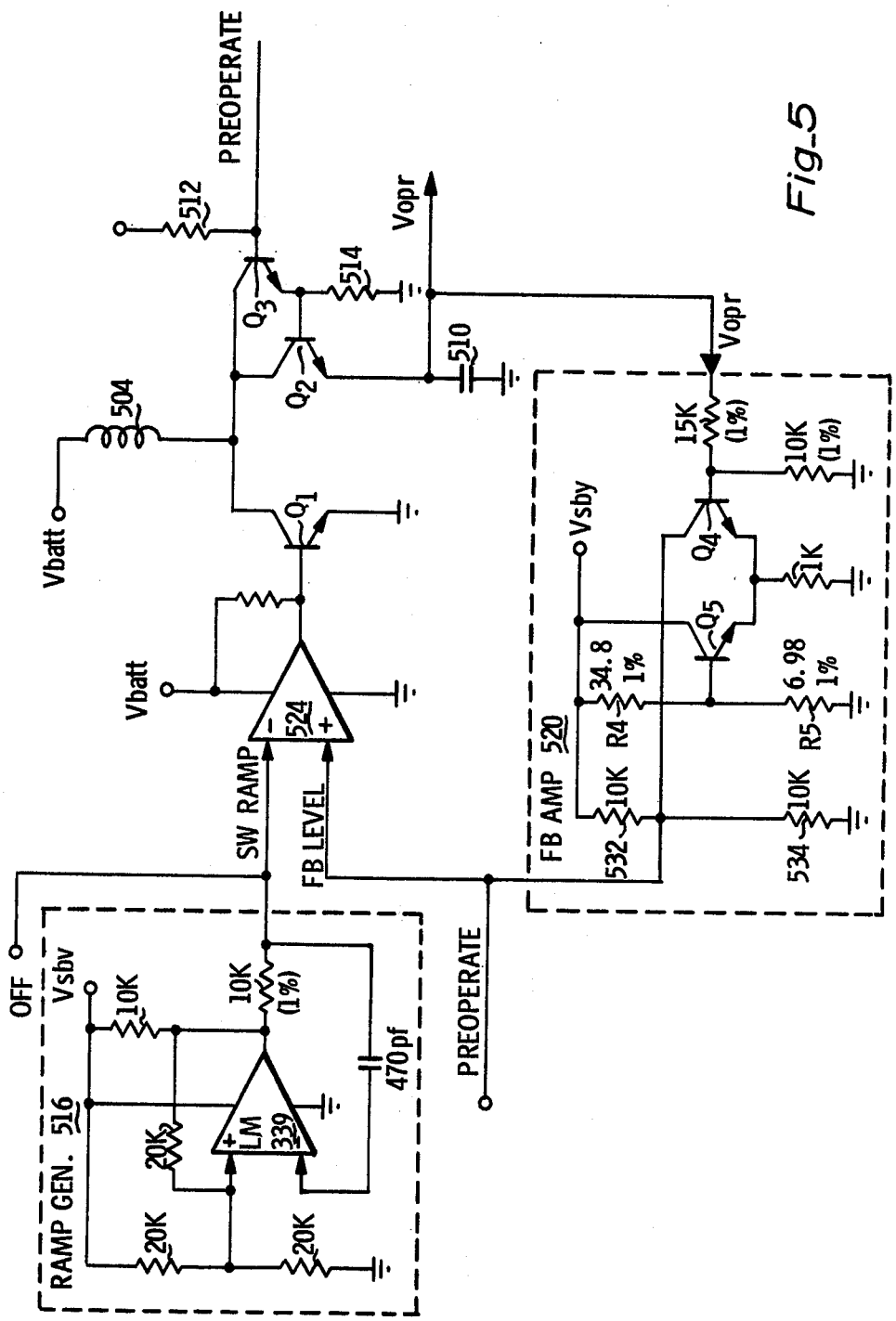
Fig_5

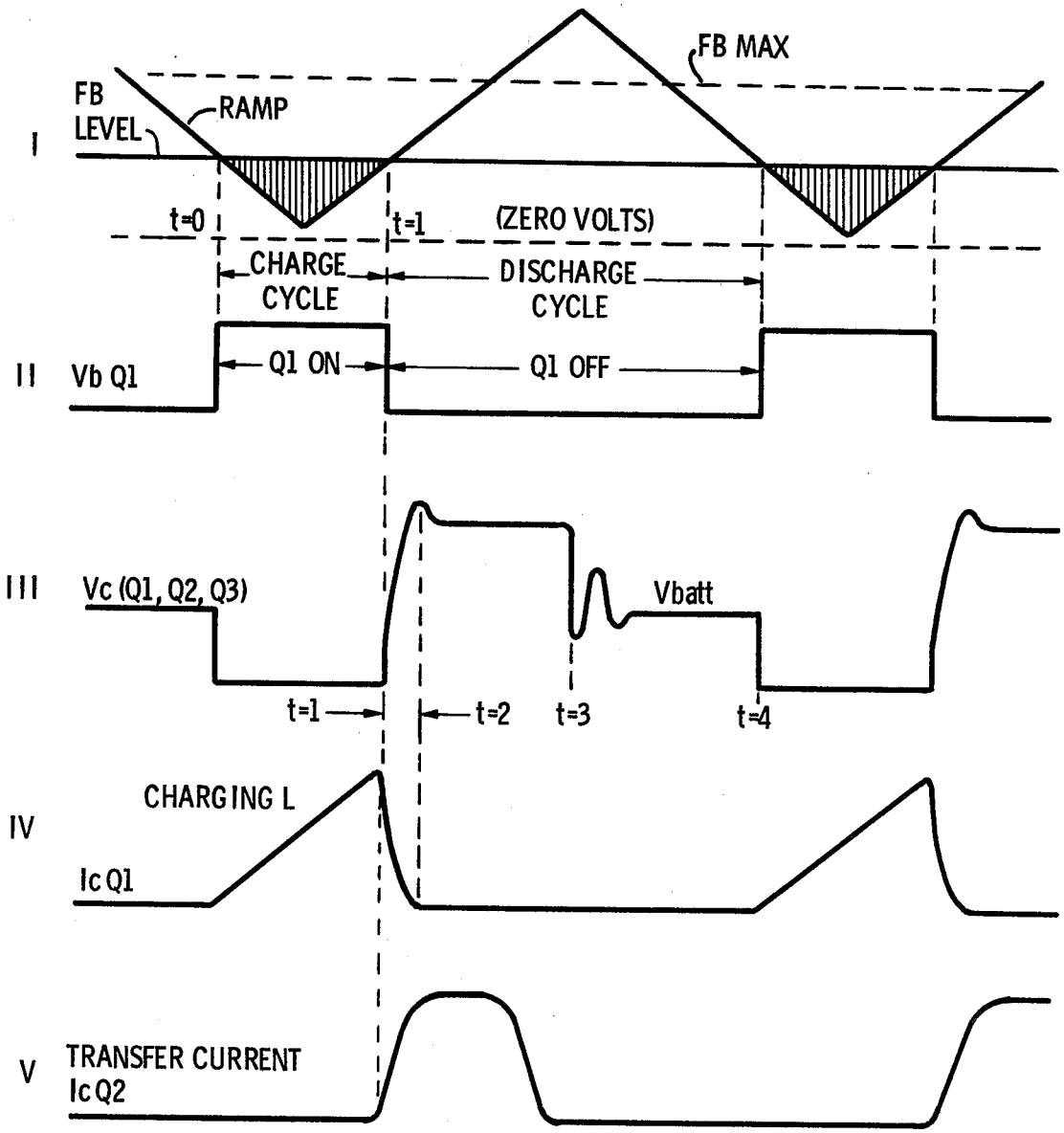
Fig_6

EFFICIENT BIDIRECTIONAL POWER CONVERTER FOR PORTABLE DATA GATHERING APPARATUS

BACKGROUND OF THE INVENTION

This invention relates to bidirectional DC-to-DC power converters, and more particularly to efficient power converters employed in a portable data gathering device.

DISCUSSION OF THE PRIOR ART

Heretofore, power converters of the present type employed a diode between the inductor and the output capacitor. The diode functioned to pass transfer current from the discharging inductor into the output capacitor during the discharge cycle, and prevented the output capacitor from discharging back through the input switching device during the charging cycle. These prior art circuits could not function to regulate down which is required to prevent tracking when the battery voltage exceeds the output voltage. Further, the prior art diodes could not be turned off to eliminate the output voltage. When the charging cycle and discharging cycle were terminated, the output capacitor continued to charge from the battery voltage through the diode. To completely terminate the output voltage required an additional switching device in series with the load which incurs an additional diode drop and switching transient losses.

SUMMARY OF THE PRESENT INVENTION

It is therefore an object of this invention to provide a bidirectional DC-to-DC power converter:

which is more efficient;

having an operating mode in which the output voltage is present, and having a standby mode in which the output voltage is terminated;

with standby and operate modes which requires a minimum of control current to change the mode of the converter; and in which the electrical energy required to switch on and maintain the output switching device during the operate mode contributes to the regulated output energy.

Briefly, the present invention accomplishes these and other objects and advantages by providing a signal-generating circuit which defines the input duty cycle and the output duty cycle by means of a periodic control signal. During the input duty cycle period, an input energy storage device is charged by an unregulated source and discharged into an output energy storage device during the output duty period. An input switching device is responsive to the periodic control signal for completing a charging path which permits the input energy storage device to charge. The output energy storage device is charged by the transfer current generated by the discharge of the input energy storage device during the output cycle for providing a regulated output voltage to the load. An output switching device connected in series between the input energy storage device and the output energy storage device establishes a discharge path therebetween which allows the transfer current to flow during the output cycle. The output switching device prevents the discharge of the output energy storage means therethrough during the input cycle. A feedback circuit responsive to variations in the output voltage causes the signal-generating device to adjust continuously redefining the input duty cycle.

BRIEF DESCRIPTION OF THE DRAWING

Further objects and advantages of this invention and the operation of the converter circuit will become apparent to those skilled in the art from the following detailed descriptions taken in conjunction with the drawings, in which:

FIG. 1 is an isometric view of the power module and control module which form the portable hand-held unit, and the service module which cooperates therewith to provide stationary operation;

FIG. 2 is a block diagram of the power module showing the memory and memory control circuitry;

FIG. 3 is a block diagram of the control module showing the microprocessor and peripheral hardware;

FIG. 4 is a block diagram of the service module showing the charging and transmission features;

FIG. 5 is a schematic of the power converter which shows cascaded switches in series between the input inductor and the output capacitor; and FIG. 6 shows the waveforms at various points in the FIG. 5 circuit.

GENERAL SYSTEM

FIG. 1 shows a portable data gathering system 100, and FIG. 2, 3, and 4 are related block diagrams of data flow and control features. System 100 includes a portable hand-held unit 110 and a stationary service module 120. Hand-held unit 110 is separable into a control module 130 and a power module 140. Control module 130 contains keyboard 132 for entering data (KEY DATA) and instructions (INSTRUCTIONS) to control logic 134, and an alphanumeric display 136 for displaying data from data port 138 (PORT DATA).

Power module 140 contains a power source 142 and power control logic 144 for providing a low power STANDBY MODE when control module 130 is not active, and an OPERATE MODE when new data enters control module 130. A standby voltage (Vsby) is applied throughout unit 110 to maintain the standby status. During the OPERATE MODE power source 142 applies an operate voltage (Vopr) to activate data flow and control circuits. Power module 140 also contains a suitable storage device such as solid state memory system 146 and accompanying control logic 148 for receiving and storing data from control module 130. Memory system 146 is mounted on same module as power source 142 and always receives a memory sustaining voltage (Vmem) therefrom. As a result, the data in memory system 146 cannot be unintentionally erased by disconnecting the power.

New data such as product numbers is entered into solid state memory 146 automatically as PORT DATA through data port 138 or manually as KEY DATA through keyboard 132. Keyboard 132 may also have provisions for additional functions to accommodate various other categories of data such as price and quantity, and to recall data from memory 146 onto display 136. When memory 146 reaches capacity, power module 140 is removed from control module 130 and inserted into communication station 152 of service module 120 (as shown in dashed lines) for transmitting the data in memory system 146 to a remote terminal. The battery 204 in power source 142 may be recharged at station 142 simultaneously with transmission. Alternatively, power module 140 may be inserted into charge station 154 (as shown in dashed lines) for storage and charging. Control module 130 may be inserted into operate station 160 (as shown in dashed lines) where it is reactivated and reconnected with memory system 146 in power module 140. Modules 130 and 140 become fully operative as a stationary data gathering device when mounted in service module 120.

STANDBY-OPERATE MODES

Hand-held unit 110 is normally in a low power STANDBY MODE in which many of the subsytems circuits are deactivated to conserve power in battery 204.

OPERATION MODE is initiated by PORT DATA from data port 138 or KEY DATA and INSTRUCTIONS from keyboard input 132. Microprocessor 134 responds to these signals by forwarding START UP to power logic 144 in power module 140 (see FIG. 2). Startup gate 210 combines START UP with BATTERY from low Vbatt detector 216 to form PREOPERATE to power supply 220 causing the generation of the operating voltage (Vopr) initiating OPERATION MODE. Vopr activates the operating circuits throughout system 110 allowing microprocessor 134 to process data. OPERATION MODE cannot be established when battery 204 approaches discharge and Vbatt drops below a predetermined low value (Vlow). $\overline{BATTERY}$ inhibits gate 210 preventing the generation of Vopr. The remaining power in battery 204 is dedicated to maintaining the data in memory system 146. $\overline{BATTERY}$ to microprocessor 134 causes activation of alarm 304 (see FIG. 3).

Shortly after PREOPERATE, startup delay circuit 226 provides OPERATE to memory control 230 which generates an internal REFRESH signal. Either OPERATE or REFRESH into addresser 234 enables gate 228 causing $\overline{ACCESS}$ into memory system 146. $\overline{ACCESS}$ present during STANDBY MODE prevents addresses from reaching memory system 146 (formed by temporary memory 240T and main memory 240M) by inhibiting a series of internal address gates. $\overline{ACCESS}$ additionally protects the data in memory 240 from spurious input by placing memory 240 in the read mode. ACCESS enables the address gates and permits memory 240 to be in either the write mode (WRITE) or the read mode ($\overline{WRITE}$) as determined by microprocessor 134.

OPERATION MODE is terminated by the expiration of a WAIT PERIOD (three seconds, for example) in microprocessor 134 initiated at START UP. WAIT PERIOD is renewed by each new PORT DATA, KEY DATA, or INSTRUCTIONS item.

PORT DATA

PORT DATA originates from a data source such as product label 306 in suitable form such as bar code 308 (see FIG. 3). PORT DATA enters hand-held unit 110 through data port 138 on probe 310 extending from control module 130. Probe 310 is placed proximate data source 306. Probe lamp 314 illuminates data source 306 causing initial reflected light to be conducted by light pipe 318 into light detector 320. Hand-held unit 110 is moved or turned slightly causing data port 138 to scan across data source 306. During scanning bar code 308 causes modulations in the reflected light level to detector 320 which forwards MODULATION to microprocessor 134. MODULATION cannot be processed through microprocessor 134 during STANDBY MODE.

In STANDBY MODE lamp drive 324 pulses lamp 314 periodically illuminating the region immediately adjacent data port 138. Once or twice a second is a suitable pulse rate. The pulse rate is established by an internal oscillator in lamp drive 324. STANDBY MODE continues until the initial reflected light is returned through data port 138 into detector 320. Detector 320 then forwards LAMP ON to lamp drive 324 which inhibits the internal pulsing oscillator causing lamp 314 to operate continuously. Detector 320 simultaneously forwards the initial return light level modulation to microprocessor 134 (MODULATION) which forwards START UP to gate 210 in power logic 144 and initiates WAIT PERIOD (3 seconds, for example). During WAIT PERIOD unit 110 is in DATA PROCESS MODE and MODULATION enters microprocessor 134 to determine whether the sequence of light levels is allowed data (PORT DATA from bar code 308) or a spuriously generated pulse sequence. PORT DATA is simultaneously advanced to temporary memory 230T and through display drive 330 to display device 136. The first N digits of PORT DATA may be one type of data (such as product number from data source 306) displayed in N digit display 332N, and the next Q digits of data may be another type of data (such as quantity) displayed in Q digit display 332Q. S digit display 332S displays status data generated during operation. The operator may view the new PORT DATA on display 136.

At the expiration of WAIT PERIOD (which is restarted by MODULATIONS) microprocessor 134 reestablishes the pulse lamp operation by forwarding LAMP DISABLE to lamp drive 324 which enables the pulsing oscillator. $\overline{START\ UP}$ terminates Vopr and system 110 is returned to STANDBY MODE.

KEY DATA

Input data, such as product numbers, may be manually entered into hand-held unit 119 through keyboard 132 (which includes keys for digits 0-9) and keyboard logic 340. The first key depressed initiates OPERATION MODE in unit 110 through START UP from microprocessor 134. As N digits of KEY DATA are keyed in, they appear simultaneously in temporary memory 240T and display device 136 starting with the left-hand digit (MSD) of N digit display 332N. The first N digits may be one class of data (product number, for instance), and the next Q digits may be another class of data such as quantity appearing display 332Q. After keying in N digits of product number and Q digits of quantity, the operator may key in CASE causing a low case "c" to appear in the LSD display 332Q. This case data is processed to temporary memory 240T and then into main memory 240M. A data processor at remote terminal 404 will interpret this entry as an order by the case of the identified product. Alternatively, the operator may key in PRICE causing a lower case "p" to appear in display 332Q. This entry is interpreted as a request for price of a particular quantity of the identified product. OPERATION MODE is terminated after expiration of WAIT PERIOD which is renewed after each item keyed in.

KEYBOARD INSTRUCTIONS

Control signals are communicated to microprocessor 134 through INSTRUCTION keys on keyboard 132. Any INSTRUCTION immediately initiates OPERATION MODE.

ENTER INSTRUCTION causes the KEY DATA or PORT DATA in temporary memory 240T to enter main memory 240M at an address specified by microprocessor 134 (MEMORY ADDRESS). If desired ENTER may also extinguish display device 136 in order to conserve power in battery 204.

CLEAR INSTRUCTION causes erroneous KEY DATA or PORT DATA to be erased from temporary memory 240T and extinguished from display device 136. By observing display 136, the operator may detect a key in error, or notice an anomoly between the product number on data source 306 and the number in display 332N. Further, microprocessor 134 monitors for errors by continuously comparing the content of temporary memory 240T with the data displayed in device 136, and provides ERROR to alarm 304 as required.

RECALL INSTRUCTION has a SELECT MODE in which a particular previous product number (or portion thereof) is recalled and a SEQUENTIAL MODE in which the entire contents of main memory 240M is systematically recalled. In SELECT MODE the desired product number (or portion thereof) is keyed in and the RECALL key depressed. Microprocessor 134 searches main memory 240T comparing every previous entry to the argument in temporary memory 240T. When a comparison is reached, the quantity originally entered with the desired product number appears in display 332Q, and alarm 304 is activated by an end-of-search signal (EOS) for microprocessor 134. In SEQUENTIAL MODE the RECALL key is pressed repeatedly and each entry in main memory 240M appears in displays 332N and 332Q starting with the most recent entry.

INFO INSTRUCTION deactivates the normal check digit required for normal entry to permit the entry of free format data such as dates, names and other miscellaneous information.

RESUME INSTRUCTION is employed when power module 140 is returned from service module 120 to control module 130 with a partially filled memory 240. RESUME INSTRUCTION permits microprocessor 134 to process the next data in to memory 240 at a LAST ENTRY POINTER to retain continuity between the new data and the previously gathered data. If the data in the returned power module 140 has already been transmitted or is otherwise no longer required, then preferably microprocessor 134 will start entering data at the beginning of memory 240 and ignore LAST ENTRY POINTER. This result is obtained by INITIALIZING microprocessor 134 with a CLEAR INSTRUCTION in combination with an INFO INSTRUCTION.

C/P/S INSTRUCTION is employed to order case quantities of individual quantities, by depressing the C/P/S key once and then entering the number of cases. Prices, quotes and availability may be requested by depressing the C/P/S key twice and three times respectively. These requests are transmitted to remote terminal 404 by communication station 152. The response may be received from remote terminal 404 by communication station 152, and entered into memory system 146. The operator then displays the responses on display 136 through the RECALL INSTRUCTION.

SERVICE MODULE 120

After the data gathering with hand-held unit 110 is completed, the operator removes power module 140 from control module 130 and inserts it into communication station 152 (see FIG. 4). TRANSMISSION MODE is effected by depressing transmit button 408 which energizes transmit panel lamp 412. The operator first secures the remote station through the conventional telephone dialing system and then engages the telephone receiver 414 with telephone interface 416. Data transmission is initiated by RTT TONE from remote terminal 420. Data in power module 140 flows across transmit bus 418 into communication station 152 and out telephone receiver 414. After completion of the data transmission RST TONE from remote station 420 terminates TRANSMISSION MODE and energizes data received panel lamp 424. An erroneous transmission results in $\overline{\text{RST TONE}}$ which energizes retransmit lamp 428.

During portable mode data gathering memory 240 may become full which is indicated by alarm 304 and by an "F" on display 332Q. Also, Vbatt may drop below the threshold of low Vbatt detector 216 generating $\overline{\text{BATTERY}}$ which activates alarm 304 and causes unit 110 to immediately go into STANDBY MODE. The depleted power module is removed from control module 130 deactivating alarm 304, and replaced by a fresh power module with a fully charged battery 204 and an empty memory 240. The depleted power module is inserted into charge station 154 for recharging by charge circuit 430. Charge station 154 also provides temporary storage for power modules between data gathering missions. Preferably communication station 152 also provides for charging battery 204 which also can store power module 140 prior to and after transmission.

Minimum Vbatt detector 436 in charge station 154 monitors Vbatt during charging. If Vbatt drops below Vmin (which is lower than Vlow of low Vbatt detector 216) minimum Vbatt detector 436 provides OFF to power supply 220 terminating Vsby and Vmem. The termination of Vmem in the OFF MODE causes the loss of the data in volatile memory 240. This data may become unreliable after Vbatt drops below Vmin due to reduction of Vmem which is normally regulated through power supply 220 from Vbatt. Further, the reduced load condition accompanying OFF MODE facilitates charging battery 204.

Operating station 160 accommodates control module 130 and permits control module 130 to cooperate with power module 140 at charging station 154 to form a stationary data gathering unit with the same data processing capability as hand-held unit 110. Operate bus 440 between charging station 154 and operating station 160 provides power and data flow connection between power module 140 and control module 130. In the stationary mode, data probe 310 extends toward the backmost side surface of service module 120. The tip of data probe 310 is position generally coplanar with back side surface, permitting the back side surface to function as a guide for the items carrying bar code labels 306. The back side surface causes the items to remain on a path parallel to and equidistant from data probe 310.

POWER SUPPLY 220

FIGS. 5 and 6 show the elements of power source or converter 220 and the waveforms generated therein during operation. Power source 220 converts the voltage from rechargable battery 204 (Vbatt) into a regulated voltage (Vopr) for application throughout hand-held unit 110. Unit 110 is a variable load because the current requirements of display 136, alarm 304, lamp 314, and control logic 134 vary from zero during STANDBY MODE to a maximum value during data processing in OPERATION MODE. In addition, the value of Vbatt varies from a fully charged value (Vmax) to a lower value (Vmin) below which power supply 220 is turned OFF by service module 120 terminating all the voltages including Vmem. While in the fully charged state when Vbatt is greater than Vopr, converter 220 regulates Vmax (which is about 5.25 volts dc in the embodiment disclosed) down to Vopr (which is 5 volts dc in the embodiment disclosed). As Vbatt slowly discharges through use, Vbatt approaches Vopr and the conversion efficiency increases. When Vbatt is slightly displaced from Vopr the efficiency of conversion is highest, and decreases slowly as Vbatt drops lower until Vbatt reaches Vmin (about 4 volts dc in the embodiment disclosed).

REGULATION OF Vopr

Input transistor Q1 is periodically turned on causing current from battery 204 to build up in inductor 504. Inductor 504 then discharges into output capacitor 510 through output transistor Q2. The amount of energy transferred from inductor 504 to capacitor 510 depends on the charging period of inductor 504. This charging period is regulated by controlling the charging cycle (on time) of transistor Q1 in response to variations in the output voltage Vopr across capacitor 510.

The on time for charging transistor Q1 is determined by the relationship between a RAMP switching signal from ramp generator 516 and an FB LEVEL from feed back amplifier 520 (see FIG. 6, waveform I). When RAMP is less than FB LEVEL (the shaded region of waveform I from $t=0$ to $t=1$) input comparator 524 provides IbQ1 from battery 204 turning transistor Q1 on. When RAMP is greater than FB LEVEL, comparator 524 turns transistor Q1 OFF by driving the base to ground (see waveform II). Transistor Q1 does not switch off immediately, but is delayed slightly by switching transients such as stored base charge in Q1 and the tendency of inductor 504 to oppose changes in current level (prior to output transistor Q2 turning on). The collector voltage of transistor Q1 (see waveform III) has a rise time extending from $t=1$ to $t=2$ caused by the above delay. The collector current of transistor Q1 (see waveform IV) has a corresponding rise time caused by the increasing emitter-collector impendance Q1 as transistor Q1 closes down. The product of the rising collector voltage VcQ1 and the falling collector current IbQ1 during the transient period between $t=1$ and $t=2$ (the shaded areas on waveforms III and IV) represents power lost each time transistor Q1 is turned on. This switching power loss may be minimized by turning on transistor Q2 immediately after transistor Q1 starts to turn off.

Transistor Q2 is turned on rapidly by control transistor Q3. During OPERATION MODE control transistor Q3 is base-biased on by a control current from battery 204 through base resistor 512. Transistor Q3 becomes forward-biased and starts to conduct collector current (IceQ3) at $t=1$ as the field in inductor 504 begins to collapse causing VcQ3 to increase. Control transistor Q3 conducts when:

VcQ3 > Vopr + VsatQ3 + VbeQ2

IceQ3 provides IbQ2 causing transistor Q2 to conduct, permitting the transfer current from the collapsing field of inductor 504 (see waveform V) to flow into output capacitance 510. Transistor Q2 functions as a periodic switch which passes transfer current when forward-biased (discharge cycle $t=2$ to $t=4$) and which isolates Vopr from VcQ2 where reversed biased (charging cycle $t=0$ to $t=1$). During the charging cycle Q1 is on and Vc (Q1, Q2, and Q3) are at VceQ1 (the internal drop across Q1) which reverse-biased Q2 preventing capacitor 510 from discharging to ground through Q1.

OPERATE-STANDBY SWITCHING

The Q2-Q3 cascade functions as an OPERATE-STANDBY switch in response to base current from control module 130. During STANDBY MODE, PREOPERATE bar (ground) is applied from control module 130 to the base of Q3 and to FB LEVEL. IbQ2 and IbQ3 go to zero, Q2 is not turned on, and Vopr drops to zero as capacitor 510 discharges. PREOPERATE from control module 130 removes the ground-restoring Q3 to the biased on condition and establishing OPERATE MODE in which Q2 periodically conducts charging capacitor 510 to Vopr.

Transistor Q3 provides the gain which permits the small control current through resistor 512 to switch the much larger transfer current through switching transistor Q2. During STANDBY MODE, which is the predominating mode, the control current is lost to ground via PREOPERATE bar. Reducing the control current through the gain of Q2 reduces the overhead energy consumption of hand-held unit 110. The control current is determined by the voltage dividing network formed by base resistor 512 and emitter resistor 514:

IbQ3 = (Vbatt − VbeQ2)/(R512 + R514)

This fixed value for IbQ3 limits IcQ3max as the inductor field collapses. IbQ2 is formed by a portion of IeQ3 (which equals IcQ3 + IbQ3) depending on the value of R514. As a result IceQ2 is also current-limited by IbQ3. The transfer current IceQ2 is fixed at IceQ2max during the initial portion of the discharge cycle ($t=2$ to $t=3$) in spite of the higher Vc(Q1, Q2, Q3) generated by the inductive kick of inductor 504.

OVERLOAD PROTECTION

FB amplifier 520 is a differential amplifier which limits the maximum charging cycle of inductor 504 for limiting the maximum current drain from battery 204 in an overload situation. As Vopr drifts from the regulated value (which is +5 volts in the disclosed embodiment) IbQ4 varies causing a corresponding change in IcQ4 and IcdQ4. FB LEVEL is taken from the collector of Q4. Overload and short circuit protection is provided by Q4 which turns off if Vopr drops below a predetermined value. At IbQ4=0, FB LEVEL (VcQ4) is fixed at a value FBmax determined by output voltage dividing network R532 and R534. No matter how low Vopr drops due to overloading, FB LEVEL cannot exceed FBmax which defines the maximum charging time for inductor 504 limiting the maximum current drain from battery 204. Q5 and network R4 and R5 fix the value of VeQ4 as IceQ4 varies due to Vopr fluctuations.

DETAILED DESCRIPTION OF THE COMPONENTS OF THE BEST MODE

Keyboard 132 may be suitable keyboard device having decimal digit keys 0-9, and function keys for INSTRUCTIONS.

Display 136 may be a conventional LED display, formatted to provide a plurality of smaller displays for each class of data in a separate position.

Data port 138 may be any suitable conventional optical pen.

Battery 204 may be four sub c nickel cadmium cells of 1.25 volts apiece for providing the 5-volt battery voltage.

Start-up delay 226 may be a series of Cmos digital counters connected in cascade to provide a suitable start-up period for power supply 220 between PREOPERATE and OPERATE.

Memory control 230 may be a conventional memory control and dynamic refresh generator.

Addresser 234 may be any suitable IC circuit which can apply MEMORY ADDRESS from microprocessor 134 or refresh address from memory control 230 to memory 240.

Memory system 146 may be a conventional dynamic random-access memory (RAM).

Microprocessor 134 may be any suitable integrated microprocessor operable with +5 volts (Vopr).

Drive display 330 may be any suitable current driver for operating display 136. The display decoding may be accomplished by microprocessor 134.

Keyboard logic 340 may be any conventional device capable of interfacing between the decimary digits 0 through 9 from keyboard 132 and the binary requirements of microprocessor 134.

ROM 350 may be any conventional read-only memory such as a series of 8316's.

Resistors 512 and 514 may be 33K ohms and 10K ohms respectively.

Ramp generator 516 may be any suitable sawtooth generator for providing at least one sloped face. A double sided ramp function is preferred, however, because both the initiation and the termination of the charging cycle ($t=0$ to $t=1$) are controlled to effect regulation twice each cycle. the ramp generator shown in FIG. 5 employs an analog comparator 524 (LM339) which oscillates at about 110KHz between a positive slope mode and a negative slope mode. During the positive slope mode, the comparator has a high impedance and Vsby is applied to the comparator input via a voltage dividing network of resistors. During the negative slope mode, the comparator has a low impedance forcing the output of the comparator to ground. Vsby is applied to the comparator input via a modified voltage dividing network, which includes a portion of the positive slope network.

Q1 may be a 2N4896, Q2 may be a 2N4895, and Q3, Q4, and Q5 may be 2N2222's. Vopr is +5 volts dc, Vsby is +12 volts dc, and Vmem is −5 volts dc.

CONCLUSION (IbQ3) (IbQ3

The objects of this invention have been accomplished by providing a bidirectional converter. The bidirectional converter is more efficient because the voltage range (Vrange) of the unregulated battery extends on either side of the regulated voltage Vopr. The maximum regulation required is only Vrange/2 as opposed to Vrange for a corresponding undirectional converter of the prior art. Generally, the efficiency of a converter decreases directly as the increment between the supply voltage and the regulated output voltage. Further, the usual regulation of converter 220 is substantially less than Vrange/2, and is very close to zero along the extensive midportion of the battery 204 discharge curve. This nominal regulation increment exists for most of the battery life. Higher regulation increments develop only during the initial and terminal phases of the battery life. Q3 provides for switching converter 220 into the OPERATE MODE only when required, leaving converter 220 predominately in the residual low power STANDBY MODE. The gain of Q3 reduces the overhead control current requirement (IbQ3) during STANDBY mode. During STANDBY MODE, the current from Q3 (IbQ3 × Q3gain) which turns Q2 on flows through the base of Q2 into output capacitor 510.

It will be apparent to those skilled in the art that various changes may be made in the described apparatus and technology without departing from the scope of the invention. Accordingly, the scope of this invention should be determined only by the wording of the following claims and their legal equivalents.

We claim as our invention:

1. A bidirectional power converter responsive to an external standby-operate signal to provide an operate mode and a standby mode, and responsive to an internal periodic control signal for providing a step up-step down regulated dc output voltage to a load, the converter adapted to be powered by a battery having a voltage which varies as the battery discharges across a range transcending the value of the regulated dc output voltage, comprising:

signal means for providing the periodic control signal which is adjusted to define an input duty cycle time period and an output duty cycle time period;

input energy storage means which is charged by the battery during the input duty cycle and which is discharged during the output duty cycle;

input switching means responsive to the periodic control signal for establishing a charging path for the input energy storage means during the input cycle;

output energy storage means which is charged by transfer current generated by the discharge of the input energy storage means during the output cycle for providing the regulated output voltage to the load;

controlled output switching means having an ON low impedance state and an OFF high impedance state, connected in series between the input energy storage means and the output energy storage means, which obtains the ON low impedance state for the duration of each output duty cycle in response to the termination of the input duty cycle for providing a discharge path allowing the transfer current to flow between the energy storage means during the output duty cycle, and which obtains the OFF high impedance state for the duration of each input duty cycle in response to the termination of the output duty cycle for disrupting the discharge path to prevent the flow of transfer current during the input duty cycle, and which further obtains the OFF high impedance state for the duration of the standby mode in response to the standby-operate signal for isolating the load from the battery;

feedback means responsive to the regulated output voltage for adjusting the periodic control signal in response to variations in the regulated output voltage.

2. The bidirectional power converter of claim 1, wherein the signal means is responsive to the feedback means for adjusting the input duty cycle time period for controlling the maximum charge attained by the input storage means for regulating the transfer current generated thereby.

3. The bidirectional power converter of claim 2, wherein:
the feedback means provides a feedback voltage to the signal means in response to variations in the regulated output voltage;
the signal means includes an oscillator means for providing a periodic waveform having at least one sloped portion; and
the signal means further includes a bistate comparator means for driving the input switching means, the comparator means compares the sloped portion of the periodic waveform with the feedback level from the feedback means for providing one output state when the slope portion of the periodic waveform has a greater value than the feedback level and for providing another output state when the slope portion of the periodic waveform has a value less than the feedback level for adjusting the input duty cycle time period.

4. The bidirectional power converter of claim 3, wherein a feedback means is responsive to the standby-operate signal for suppressing the feedback level during the standby mode which prevents the input storage means from charging by preventing the initiation of the input duty cycle which prevents the input switching means from conducting.

5. The bidirectional power converter of claim 4, wherein the input energy storage means is an inductor which builds up an inductive field therearound during the input duty cycle due to the progressively increasing charging current flowing therethrough from the battery.

6. The bidirectional power converter of claim 5, wherein the output energy storage means is a capacitor which is charged during the output duty cycle by the transfer current generated from the collapse of the inductive field.

7. The bidirectional power converter of claim 6, wherein the output switching means has a control element responsive to the standby-operate signal and a switching element which conducts transfer current from the inductor to the capacitor.

8. The bidirectional power converter of claim 7, wherein the output switching means switching element is reverse-biased during the input duty cycle and becomes forward-biased by the inductor generated voltage as the inductive field collapses during the output duty cycle.

9. The bidirectional power converter of claim 8, wherein:
the switching element is forward-biased only during the discharge portion of the output duty cycle when the conductive field is collapsing;
the switching element is reverse-biased to prevent current flow therethrough during the remaining uncommitted portion of the output duty cycle whenever the voltage from the battery is less than the regulated output voltage; and
the switching element is current-limited to prevent current flow therethrough during the remaining uncommitted portion of the output cycle whenever the voltage from the battery is greater than the regulated output voltage.

10. The bidirectional power converter of claim 9, wherein the output switching means is formed by a control transistor responsive to the standby-operate signal connected in cascade with a switching transistor which passes the transfer current.

11. The bidirectional power converter of claim 5, wherein the periodic waveform from the oscillator has a fixed period which is sufficiently short relative to the size of the inductor to allow the inductor to charge linearly during the input duty cycle.

12. The bidirectional power converter of claim 3, wherein the slope portion of the periodic waveform is a ramp for adjusting the input duty cycle time period.

13. The bidirectional power converter of claim 3, wherein the periodic waveform has a first portion each cycle sloped in one direction for initiating the input duty cycle, and a second portion each cycle sloped in the other direction for terminating the input duty cycle.

14. The bidirectional power converter of claim 13, wherein the periodic waveform is a double-sided ramp function.

* * * * *